United States Patent [19]

Thyssens

[11] 3,772,651

[45] Nov. 13, 1973

[54] LOCK-OUT CIRCUIT

[75] Inventor: Guido Maria Josepha Benedikt Thyssens, Wilrijk, Belgium

[73] Assignee: International Standard Electric Corporation, New York, N.Y.

[22] Filed: June 21, 1972

[21] Appl. No.: 264,980

[30] Foreign Application Priority Data

July 8, 1971 Belgium ............................... 769661

[52] U.S. Cl. 340/147 CN, 179/18 ET, 340/147 LP, 340/166 R

[51] Int. Cl. ............................................ H04q 1/00

[58] Field of Search .................. 340/147 LP, 166 R, 340/147 CN; 179/17 B, 18 ET

[56] References Cited

UNITED STATES PATENTS

| | | | |
|---|---|---|---|
| 2,876,289 | 3/1959 | Faulkner | 179/18 ET |
| 3,131,261 | 4/1964 | Avery et al. | 179/18 ET |
| 3,235,664 | 2/1966 | Muruga et al. | 179/18 ET |
| 3,597,737 | 8/1971 | Wallace, Jr. | 340/147 LP |
| 3,633,163 | 1/1972 | Birchmeier | 340/166 R X |

*Primary Examiner*—Donald J. Yusko
*Attorney*—C. Cornell Remsen, Jr. et al.

[57] ABSTRACT

A lock-out circuit enables one out of 250 registers to be connected to one out of a number of translators. Relays used to interconnect the registers and the translators are driven from both ends, so that the number of diodes required in the translators is reduced and a multiple cable through 250 registers is avoided.

35 Claims, 10 Drawing Figures

LOCK-OUT CIRCUIT

BACKGROUND OF THE INVENTION

1. Field of the Invention

The present invention relates to a lock-out circuit with a plurality of inputs and a plurality of outputs to which bistate, or bistable, devices are connected in such a way that only one bistate device is operated irrespective of the number of inputs which may simultaneously be activated.

2. Description of the Prior Art

Such a lock-out circuit is known from Belgian Patent No. 529,169 (A. DUCAMP et al 2–99/100) and more particularly from FIG. 6 thereof. This known lock-out circuit which is built up by means of diodes forms part of a telephone exchange and is used to perform the selection of a single one out of a plurality of register circuits when one or more of the latter simultaneously request a connection to a translator circuit. These register circuits each form a distinct one of the inputs of the lock-out circuit having a like number of outputs, each of the outputs being associated to a distinct one of the inputs and being connected to a distinct relay or bistate device which, when operated, is adapted to establish a multiconductor connection between the corresponding register circuit and the translator circuit. When the number of inputs and outputs is high this known diode lock-out circuit is very expensive due to the fact that it includes a very large number of diodes. Indeed when the number of inputs and the number of outputs are both equal to $n$ the number of diodes is equal to $n(n-1)$.

An object of the present invention is therefore to provide a lock-out circuit of the above type, but which has a reduced number of outputs for a same number of bistate devices and, is therefore, less expensive.

The present lock-out circuit is particularly characterized in that said circuit has two series of outputs and that said devices are coupled to a distinct pair of outputs from said two series.

It should be noted that the above mentioned Belgian patent No 529 169 and more particularly FIG. 2 thereof discloses a lock-out circuit with a plurality of inputs and with two series of outputs to which relays are connected and such that for each series of outputs only one relay is operated so that irrespective of the number of inputs which may be simultaneously activated only one combination of two relays can finally be energized. Thus, in this known lock-out circuit wherein the total number of outputs of these two series is also smaller than the number of inputs each of these outputs is connected to a distinct relay, the object there being to reduce both the number of diodes and the number of relays. On the other hand, in the present application one may reduce the number of diodes while avoiding a coded response with a combination of operated relays. This is advantageous f.i. for the interconnection of a register circuit with a translator circuit, as is the case in the lock-out circuit according to FIG. 6 of the above mentioned Belgian patent as otherwise complicated and costly contact pyramids would have to be used.

Another object of the present invention is to finally operate a single bistate device directly from the signals produced at said outputs.

Another characteristic of the prsent lock-out circuit is that each of said bistate devices has only two terminals and may be operated by a change in the current flowing between the two paired outputs.

Thus, there is no need for a two-input AND-gate fed by a pair of outputs and having an output terminal connected to a relay.

In the lock-out circuit according to FIG. 2 of the above mentioned Belgian patent each of 16 register circuits or inputs is connected via a common resistance and decoupling diodes to a distinct pair of input terminals from a first and a second series of four input terminals of a first and a second lock-out arrangement having said first and second series of outputs, in such a manner that a group of four register circuits is connected in parallel to each input terminal. Each of these two lock-out arrangements is constituted by a four by four diode lock-out matrix with a missing diagonal ($4 \times 3 = 12$ diodes) and is adapted to activate only one of its outputs irrespective of the number of its input terminals which may be simultaneously activated and to prevent the 12 inputs which are not connected to the input terminal corresponding to the activated output from activating the three input terminals of the lock-out arrangement to which they are connected.

Indeed, in this lock-out arrangement an inhibiting battery potential is applied to these three input terminals due to which a potential drop occurs in the resistances connected to these three input terminals so that the corresponding 12 inputs are inhibited. Since each input is connected to the two lock-out arrangements and since the latter operate simultaneously finally 15 of the 16 inputs are inhibited. This coding arrangement enables to reduce the number of diodes in the lock-out circuit or diode matrix which instead of $16 \times 15 = 240$, becomes $2 \times 4 \times 3 = 24$ plus the diodes at the input of the two lock-out arrangements or diode submatrices, i.e. $2 \times 4 \times 4 = 32$. As mentioned this splitting of the original large lock-out matrix however involves branching several inputs in parallel via decoupling diodes, i.e. four in the above case, on each input terminal of the two sub-matrices. There is an upper limit to the number of circuits which may be put in parallel in this manner, e.g. the common resistances of the paralleled circuits are also effectively in parallel thereby reducing the potential drop which is effective in the lock-out operation.

It has been found that in order that the lock-out circuit should operate correctly not more than 10 register circuits may be connected to an input terminal. Consequently the known lock-out circuit may only be connected to a maximum of 100 register circuits, i.e. have a maximum of 100 inputs connected to 10 input terminals of each of the first and second lock-out arrangements.

It is therefore another object of the present invention to provide a lock-out circuit of the type disclosed in FIG. 2 of Belgian patent No 529 169, but which may have an arbitrary number of inputs.

According to the invention this is achieved due to the fact that it includes a first and a second lock-out arrangement, the operation of said second lock-out arrangement being enabled only after the operation of said first lock-out arrangement, and that each of said inputs is connected via a common resistance and decoupling diodes to a distinct pair of input terminals from a first and a second series of input terminals of said first and said second lock-out arrangement having said first and second series of outputs in such a manner that a group of inputs is coupled to each input terminal, each of said lock-out arrangements being adapted to activate only one of its outputs irrespective of the number of its input terminals which may simultaneously be activated, said first lock-out circuit when operated preventing all the inputs which are not connected to the input terminal corresponding to the activated output from activating the input terminals of the two lock-out arrangements to which they are connected.

Hence, only the inputs of the group of inputs connected to the input terminal corresponding to the activated output may activate the input terminals of the second lock-out arrangement. This means that only one of the inputs of each group of inputs connected to each of the latter input terminals may be activated so that the number of inputs connected to an input terminal of the second lock-out arrangement may be arbitrarily high. Thus, for instance, in a lock-out circuit connected to 250 register circuits it is possible to branch a maximum of 10 circuits in parallel on each input terminal of a first sub-matrix with 25 such terminals and it is immaterial that the second sub-matrix with 10 input terminals has each time 25 circuits branched in parallel on these because only one out of the 25 can be effective at a time.

Since a high number of register circuits may be connected to a relatively small number of input terminals for instance 250, (i.e. 25 × 10) register circuits to 35(i.e. 25 + 10) input terminals in the above example, the cabling between these 250 register circuits and the input terminals of the lock-out circuit as well as that between the outputs of the latter circuit and the above mentioned 250 relays which are located in the corresponding register circuits is each time reduced from 250 individual wires to 35,i.e. 25 + 10, wires which are each connected in multiple between an input terminal or an output of the lock-out circuit and the register circuits of a distinct one of the 25 or 10 groups in which the 250 register circuits are subdivided depending on the lock-out arrangement considered.

In a preferred embodiment of the lock-out circuit according to the present invention each of a plurality of inputs is connected via a common resistance and diodes to a distinct pair of terminals from a first and a second series of input terminals of a first and a second lock-out arrangement having a first and a second series of outputs which are paired via a relay, a group of inputs being coupled to each input terminal. Each of the lock-out arrangements is adapted to activate only one of its outputs irrespective of the number of its input terminals which may simultaneously be activated. The operation of the second lock-out arrangement is enabled only after the correct operation of the first lock-out arrangement which when operated prevents all the inputs which are not connected to the input terminal corresponding to the activated output from activating the input terminals of the two lock-out arrangements to which they are connected.

The present invention also relates to a lock-out circuit with a plurality of inputs and with a plurality of outputs and such that only one output is activated irrespective of the number of inputs which may simultaneously be activated, characterized in that each input is coupled to temporary lock-out means and to definitive lock-out means, the temporary and definitive lock-out means coupled to an input being successively operated when this one input is activated due to which temporary and definitive inhibiting potentials are applied to all the inputs, said one input terminal excepted.

The present invention further also relates to a lock-out circuit with a plurality of inputs and with a plurality of outputs and such that only one output is activated irrespective of the number of inputs which may simultaneously be activated, characterized in that it is constituted by a plurality of first lock-out arrangements which are each coupled to the inputs of an associated group of the groups of inputs wherein said inputs are subdivided and by a second lock-out arrangement which is coupled to all the inputs of said groups, each of said first lock-out arrangements being adapted when an input of the associated group is activated to inhibit all but said input of the associated group of inputs and said second lock-out arrangement being adapted to inhibit the inputs of all but those of said associated group of inputs.

Finally the present invention relates to a lock-out circuit with $m$ inputs and a plurality of outputs such that only one output is activated irrespective of the number of inputs which may be simultaneously activated, characterized in that each of said $m$ inputs is coupled on the one hand to the input of an associated one of a plurality of bistate devices and on the other hand via diodes to $p$ out of $q$ wires, the number of combinations $C^p_q$ being at least equal to $m$ and said $p$ wires being coupled via further diodes to all the outputs of the bistate devices except to that of the associated bistate device, in such a manner that when a said input is activated the associated bistate device is operated due to which an inhibiting potential is applied to all the inputs, except said activated one.

BRIEF DESCRIPTION OF THE DRAWINGS

The above mentioned and other objects and features of the invention will be more apparent and the invention itself will be best understood by referring to the following description of an embodiment taken in conjunction with the accompanying drawings wherein.

DESCRIPTION OF PREFERRED EMBODIMENTS

Figure 1:
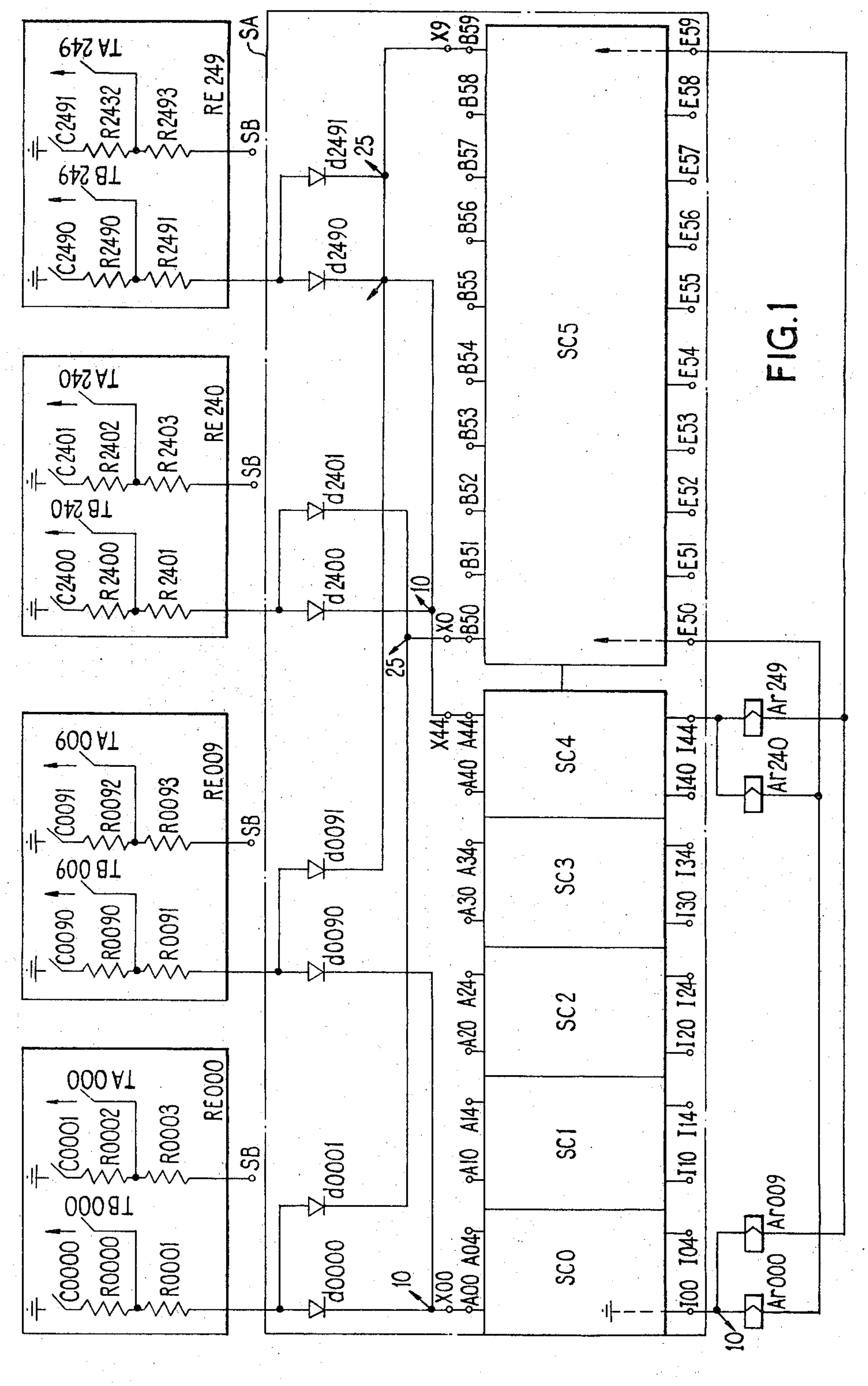
FIG. 1 is a schematic view of a lock-out circuit according to the present invention.

Principally referring to FIG. 1 the lock-out circuit shown therein includes 250 register circuits RE 000 to RE 249, such as RE 000, RE 009, RE 240, Re 249, which may each be connected to the one or the other of two translator circuits under the control of a first or a second relay which are both associated to this register circuit. For instance, any of the 250 register circuits RE 000 to RE 249 may be connected to a translator circuit which will hereinafter be called TRA under the control of an associated first relay A*r*000 to A*r*249, respectively, which is included in the corresponding register circuit although this does not appear from the figure. Since only one register circuit at the time may be connected to a translator circuit inputs of the register circuits are coupled to the associated first and second relays via a lock-out circuit. For instance, the inputs of the register circuits RE 000 to RE 249 are coupled to the associated first relays Ar 000 to Ar 249 via the lock-out circuit shown. Likewise the inputs of these register circuits are coupled to the associated second relays (not shown) via a similar lock-out circuit (not shown). Since both the lock-out circuits are identical only one of them is considered in detail hereinafter.

The 250 register circuits RE 000 to RE 249 are subdivided in 25 first groups of 10 register circuits an in 10 second groups of 25 register circuits in such a manner that each register circuit belongs to a distinct pair of first and second groups. The 25 first groups include the register circuits
RE000, RE001, . . . , RE008, RE009 to
RE240, RE241, . . . , RE248, RE249 respectively,
whilst the second groups include the register circuits
RE000, RE010, . . . , RE230, RE240 to
RE009, RE019, . . . , RE239, RE249 respectively.

The registers belonging to a same first group are connected in parallel to a common first terminal, whilst the registers belonging to a same second group are connected in parallel to a common second terminal. For instance the 10 register circuits RE000 to RE009 belonging to a same first group are connected in parallel to a common first terminal X00 each time via the series connection of a ground, a call contact *c*0000 to *c*0090, two resistances R0000, R0001 to R0090, R0091 and a decoupling diode *d*0000 to *d*0090 respectively;

the 10 register circuits RE240 to RE249 belonging to a same first group are connected in parallel to a common first terminal X44 each time via the series connection of a ground, a call contact *c*2400 to *c*2490, two resistances R2400, R2401 to R2490, R2491 and a decoupling diode d240 to d249 respectively;

the 25 register circuits RE000 to RE240 belonging to a same second group a ground are connected in parallel to a common second terminal X*o* each time via the series connection of a ground, a call contact *c*0000 to *c*2400, two resistances R0000, R0001 to R2400, R2401 and a decoupling diode *d*0001 to *d*2401 respectively;

the 25 register circuits RE009 to RE249 belonging to a same second group a ground are connected in parallel to a common second terminal X9 each time via the series connection of a ground, a call contact *c*0090, *c*2490 two resistances R0090, R0091 to R2490, R2491 and a decoupling diode *d*0091 to *d*2491 respectively.

From the above it follows that the register circuits of each of the 25 groups of 10 register circuits are connected in parallel to a distinct one of the 25 first terminals X00–X04 to X40–X44, only X00 and X44 being shown, whilst the register circuits of each of the 10 groups of 25 register circuits are connected in parallel to a distinct one of the 10 second terminals X0 to X9, only X0 and X9 being shown.

The junction point of each pair of resistances R0000, R0001 to R2490, R2491 is connected to battery via a make contact TB000 to TB249 which is closed when the corresponding register circuit RE000 to RE249 has been connected to the other translator which will hereinafter be called TRB. Likewise, the junction point of each pair of resistances R0002, R0003 to R2492, R2493 is connected to battery via a make contact TA000 to TA249 which is closed when the corresponding register circuit RE000 to RE249 has been connected to the translator circuit TRA.

The lock-out circuit shown includes a first lock-out arrangement constituted by the five first selection circuits SC0 to SC4 and a second lock-out arrangement constituted by a second selection circuit SC5 which together form the selection arrangement SA. The first selection circuits SC0 to SC4 of the first lock-out arrangement each have five input terminals A00–A04 to A40–A44 respectively and five outputs I00–I04 to I40–I44 respectively. The second selection circuit or lock-out arrangement SC5 and 10 input terminals B50 to B59 and 10 outputs E50 to E59. The input terminals A00–A04 to A40–A44 are connected to the above mentioned first terminals X00–X04 to X40–X44 respectively, whilst the input terminals B50 to B59 are connected to the above mentioned second terminals X0 to X9 respectively. Hence, the 5X5 groups of 10 register circuits are connected to the 5X5 input terminals of the five first selection circuits SC0 to SC4 of the first lock-out arrangement, whilst the 10 groups of 25 registers are connected to the 10 input terminals of the second selection circuit or lock-out arrangement SC5. Since each of the input terminals A00 to A44 and B50 to B59 is associated to a corresponding one of the outputs I00 to I44 and E50 to E59 respectively, one may state that the 25 outputs I00 to I44 of the first selection circuits SC0 to SC4 are each associated to a distinct one of the 25 first groups of 10 register circuits, whilst the 10 outputs E50 to E59 of the second selection circuit SC5 are each associated to a distinct one of the 10 second groups of 25 register circuits. Therefore a relay associated to a particular register circuit is connected between those outputs of SC0–SC4 and SC5 which are associated to the first and second groups to which this register circuit belongs. For instance :

relay A*r*000 is connected between the outputs I00 and E50 since this relay is associated to the register circuit RE000 which belongs to the first (RE000 to RE009) and second (RE000 to RE249) groups to which the terminals I00 and E50 are associated;

relay Ar249 is connected between the outputs I44 and E59 since this relay is associated to the register circuit RE249 which belongs to the first (RE240 to RE249) and second (RE000 to RE249) groups to which the terminals I44 and E59 are associated.

Each of the selection circuits SC0 to SC4 of the first lock-out arrangement is adapted to select one of its outputs I00–I04 to I40–I44 and to connect a ground thereat upon one or more of its input terminals being grounded, whilst the second selection circuit or lock-out arrangement SC5 is adapted to select one of its outputs E50 to E59 and to connect a battery thereat upon one or more of its input terminals being grounded.

In brief the operation of the above described lock-out circuit is as follows.

When a register circuit, e.g. RE000, calls for being connected to one of the translator circuits TRA and TRB which are supposed to be both available (contacts TA000 to TA249 and TB000 to TB249 open), the call contacts *c*0000 and *c*0001 are closed. Considering only contact *c*0000 a ground is thus applied to the input terminal A00 of the first selection circuit of the first lock-out arrangement SC0 and to the input terminal B50 of the second selection circuit or lock-out arrangement SC5 in the following circuit : ground, contact *c*0000, resistances R0000 and R0001, diode *d*0000 to input terminal A00;
diode *d*0001 to input terminal B50.

Several other register circuits may call for being connected to the translator circuit TRA and they likewise each apply a ground to the two terminals of the lock-out arrangements SC0–SC4 and SC5 to which they are connected. A lock-out operation is then performed in the first lock-out arrangement SC0 to SC4 and when this operation is finished a ground is finally applied to a single one of the outputs I00 to I44. By the thus produced lock-out operation 24 of the 25 groups of register circuits connected to the 25 input terminals A00 to A44 are inhibited so that each of the 10 input terminals B50 to B59 may be activated by only one of the register circuits connected thereat.

Before the second lock-out arrangement SC5 starts performing a lock-out operation it is successively checked :

by means of a check circuit if the first lock -out arrangement has performed a correct operation; ;

by means of a double test circuit if the double test circuit included in the other lock-out circuit is operated, this in order to prevent a same register circuit from operating the two translator circuits.

When both checks are successful the second lock-out arrangement SC5 is operated due to which a single one of its outputs E50 to E59 is selected by connecting a battery thereat. Consequently the relay which is connected to the two activated outputs is energized by the current flowing therethrough. For instance, when outputs I00 of SC0 to SC4 and E50 of SC5 are activated relay Ar00 is energized. This relay connects the register circuit RE000 connected to the translator circuit TRA and by the closure of its contact TA000 prevents the register circuit RE000 from making a call to the translator TRB.

Principally referring to FIGS. 2 to 9 the operation of the above lock-out circuit will hereinafter be described in more detail. Hereby it should be noted that the first selection circuit SC0 is shown on FIGS. 2, 3 and 7, that the first selection circuit SC4 is represented on FIGS. 4, 6 and 8 and that the second selection circuit SC5 is shown on FIGS. 5 and 9. The various elements belonging to the selection circuits SC0, SC4 and SC5 are indicated by references formed by a letter followed by 0, 4 or 5 and by a digit or number. For instance, R010 is a resistance of SC0 and T500 is a transistor of SC5.

It is supposed that in the manner described above a ground at an input is simultaneously applied to the input terminals A00 (FIG. 3) and B50 (FIG. 5) of the first and second selection circuits SC0 and SC5 due to the register circuit RE000 having closed its call contact *c*0000.

A current then flows from this input to battery via contact *c*0000, resistances R0000 and R0001, diode *d*0000, terminal X00, input terminal A00 (FIG. 3), column conductor *c*010 of a lock-out diode matrix DM00 with a missing diagonal, resistor R000, diode *d*050, resistor R010 (FIG. 7), diode *d*070 and resistor R015. Consequently predetermined potentials are applied to the bases of the NPN transistors T000 (FIG. 3) and T010 (FIG. 7) and to the column conductor C070 (FIG. 7) of a lock-out diode matrix DM01–DM41, these potentials tending to make these transistors conductive.

Figure 2:
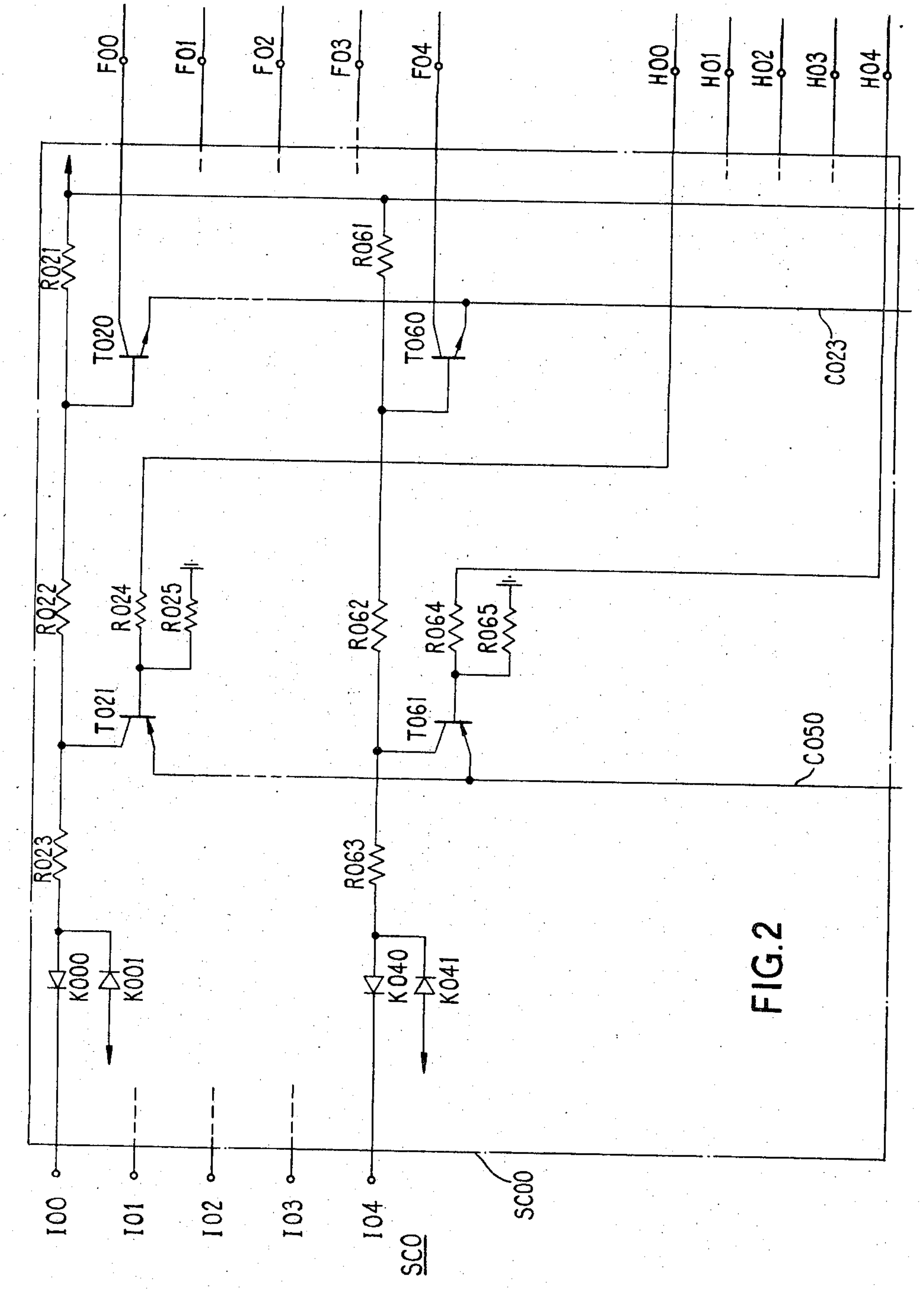
FIGS. 2 to 9 arranged as shown in FIG. 10 represent parts SCO, SC4 and SC5 of FIG. 1 in more detail.
Figure 3:
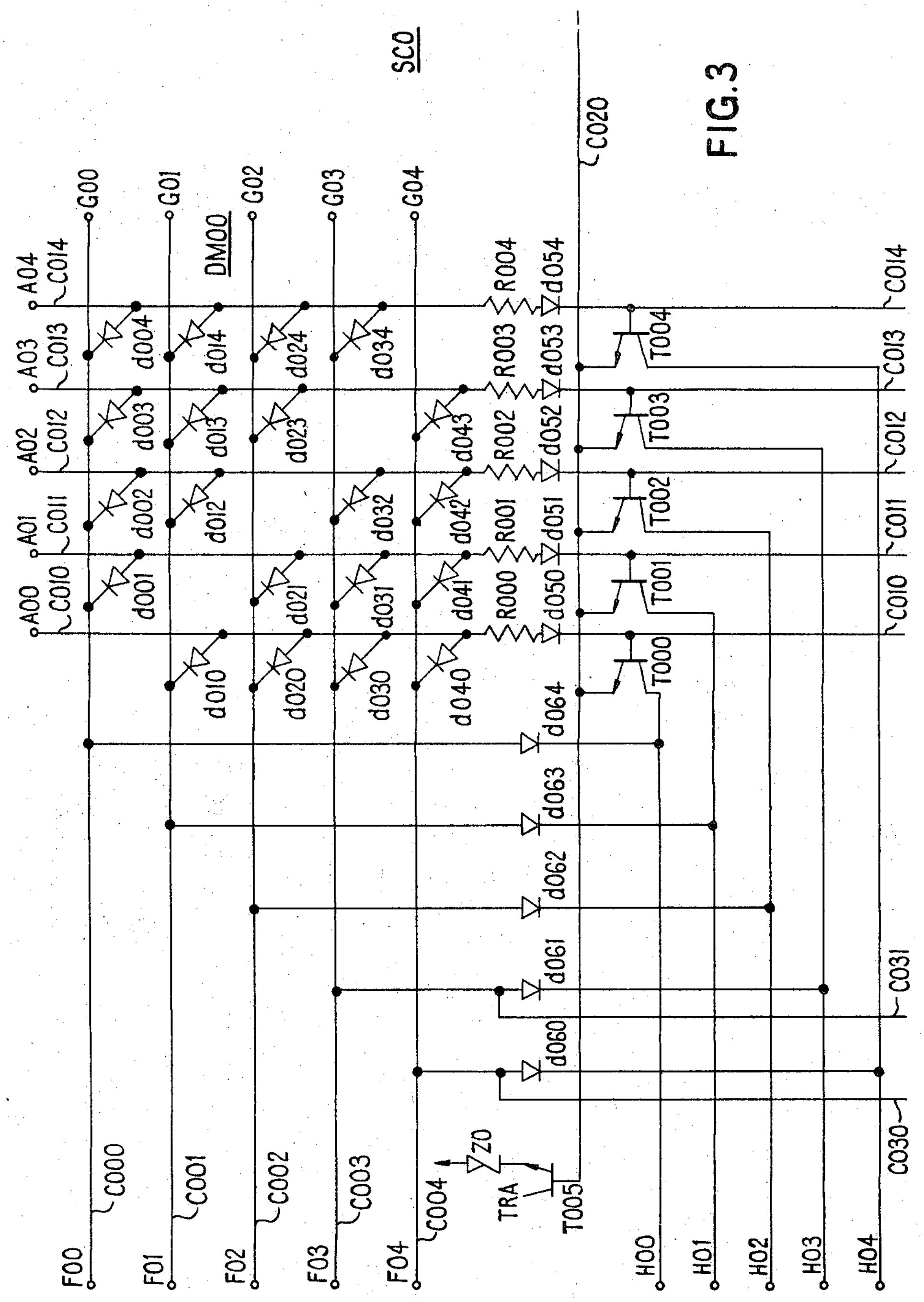
Figure 4:
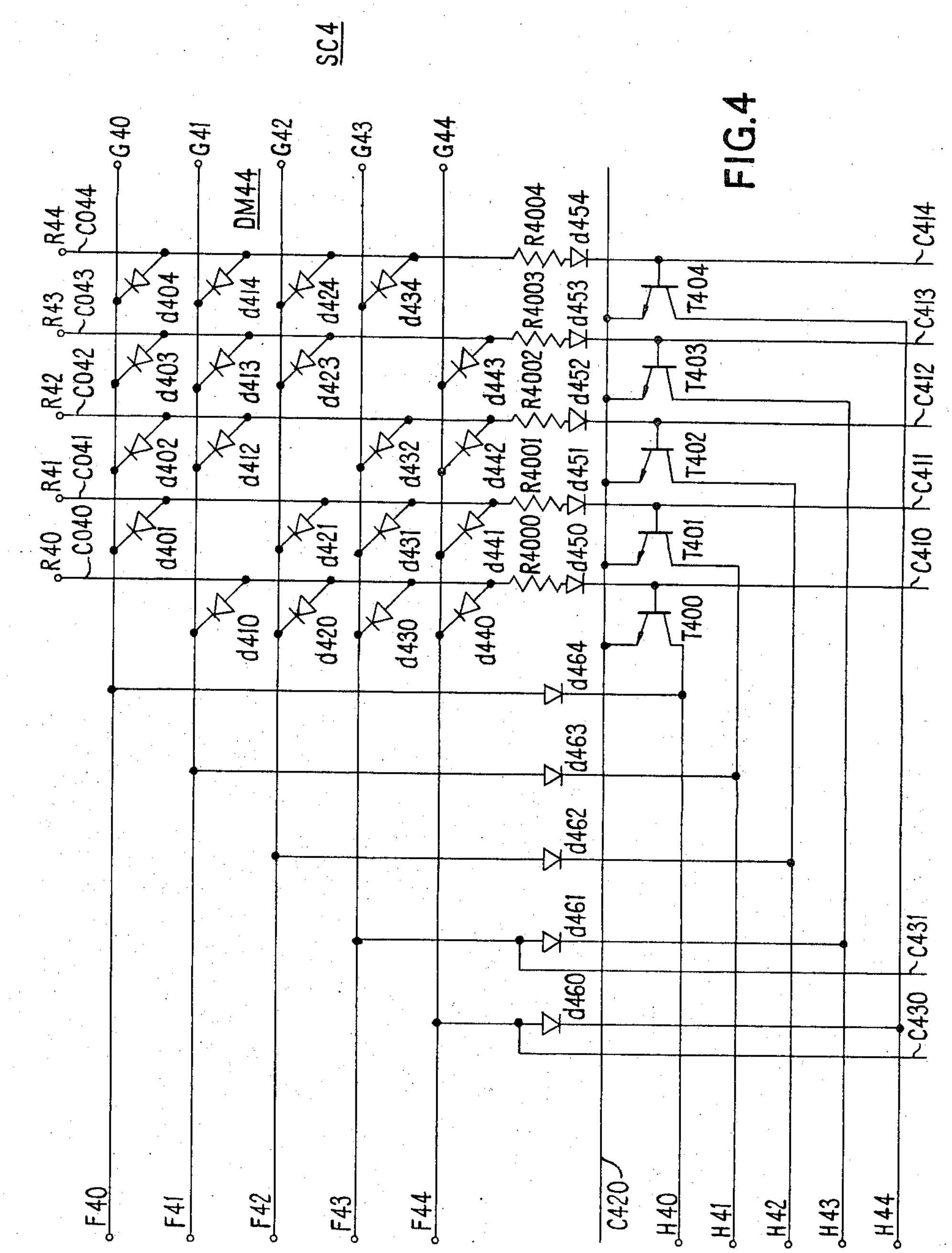

The NPN transistor T000 (FIG. 3) is made conductive by the ground applied to its base since its emitter is connected to battery via the base-to-emitter junction of transistor T005 and the Zener diode Z*o* with a Zener voltage of about 4 Volts, whilst its collector is connected to ground via terminal H00 and the resistors R024 and R025 (FIG. 2). The transistor T005 the collector of which is connected to ground in the translator TRA is made conductive together with transistor T000 and connects the inhibiting battery potential of − 44 Volts, i.e. −48 Volts less the Zener voltage, to conductor *c*000 via diode *d*064 and hence to the input terminals A01 to A04 of the group A00 to A04 via the diodes *d*001 to *d*004 respectively. In this way, when another calling ground is applied to one of the latter input terminals A01 to A04, e.g. to A04, of the selection circuit SC0 current from this ground will be derived towards this battery of −44 Volts in the following circuit : ground on A04 (FIG. 3), column condcutor *c*014 of DM00, diode *d*004, row conductor *c*000 of DM00, diode *d*064, collector-to-emitter junction of transistor T000, base-to-emitter junction of transistor T005, Zener diode Z0, battery. Hence, the input terminals A01 to A04 are inhibited and transistors T001 to T004 are in principle prevented from being operated so that the diode matrix DM00 has performed a lock-out operation.

The conductive transistor T000 also prepares the operation of the PNP transistor T021 (FIG. 2) by connecting the above mentioned battery of −44 Volts to the base of this transistor T021 via the transistors T005 and T000, terminal H00 and resistance R024. Transistor T021 is however prevented from being operated since its emitter is not connected to a suitable potential at that moment.

The transistor T010 (FIG. 7) is made conductive by the ground applied to its base since its emitter and collector are both suitably biassed. It then connects a battery to the row conductor *c*060 of the lock-out diode matrix DM01–DM41 via the protection diode *d*080 and hence to the input terminals A10 (not shown) to A44 of all the other groups such as A40–A44 via diodes D450–D454, resistances R410–R414, diodes *d*450–*d*454 and resistances R400–R404. In this way, when another calling ground is applied to one of the input terminals of the other first selection circuits SC1 (not shown) to SC4, e.g. to A44 of the selection circuit SC4, current will be derived from this ground towards this battery in the following circuit : ground on A44 (FIG. 4), column conductor *c*044 of the lock-out diode matrix DM40, resistor R404, diode *d*454, conductor *c*414 (FIG. 8), resistor R414 of the lock-out diode matrix DM01–DM41, diode D454, row conductors *c*460 to *c*060 (FIG. 7) of DM41 to DM01, collector-to-emitter junction of transistor T010, diode *d*080, battery. Hence, the input terminals A10 (not shown) to A44 are hence inhibited and the transistors T110 (not shown) to T410 and T100 (not shown) to T410 are in principle prevented from being operated so that the diode matrix DM01–DM41 has performed a lock-out operation.

It should be noted that by the inhibiting battery potentials applied to the input terminals A10 (not shown) to A44 in the manner described above, and more particularly due to the voltage drops then occurring across the resistances in the register circuits RE010 to RE249 connected to these input terminals, all the calls made by these registers are ineffective.

The reason why the −44 Volts potential is provided is that the operation of the transistor T010 should not be prevented when transistor T000 is operated before transistor T010. Indeed, when this happens the base of transistor T000 cannot decrease below −44 Volts so that current will still be able to flow to the −48 Volts potential to which the emitter of transistor T010 is connected.

The above described selection or lock-out operations performed by the diode matrices DM00 to DM04 and DM01–DM41 are not definitive ones due to the fact that the transistors T000 to T404 and T010 to T410 as well as the values of the resistances included in their respective operating circuits are generally not identical. When several register circuits simultaneously call for a translator, it may therefore happen that the distribution of the currents is such that one or more of these transistors are made more or less conductive.

In order to realize a definitive lock-out operation between the transistors T000 to T404, additional lock-out means which will hereinafter be described in detail are required.

When the NPN transistor (FIG. 7) becomes conductive the potential at the junction point of the resistors R019 and R020 is decreased due to which the PNP transistor T012 becomes conductive. Consequently the base potential of the NPN transistor T001 is increased, whilst that of the PNP transistor T013 is decreased so that finally both these transistors T011 and T013 become conductive.

The conductive transistor T011 applies an inhibiting battery potential of –48 Volts to the row conductor c040 of the diode matrix DM02–DM42 and hence to the input terminals A10 (not shown) to A44. For instance, this battery is applied from the conductor c040 to the input terminals A40 to A44 via the diodes D400, D401 and d440–d443, d430–d433. Transistor T011 hence takes over the function of transistor T010. In this way, a ground applied to any of the sets of input terminals A10–A14 (not shown) to A40–A44 is prevented from operating an associated transistor T100 (not shown) to T404 forming part of the selection circuits SC1 to SC4 respectively. For instance, when a ground is applied to input terminal A44 (FIG. 4) current is prevented to flow to the corresponding transistor T404 and also to the transistor T410 since it is derived via column conductor c044 of the lock-out diode matrix DM40, diode d433, row conductor c403, conductor c431, diode D401, row conductors c440 to c040 of the lock-out diode matrix DM42–DM02, collector-to-emitter junction of transistor T011, diode D090, battery.

It should be noted that even when a plurality of transistors T010 to T040 were operated simultaneously the chance that a plurality of the associated transistors T011 to T041 are operated simultaneously is substantially zero so that the lock-out performed by one of the latter transistors is really a definitive one.

The conductive transistor T013 applies a full ground to the emitters of the transistors T021 to T061 (FIG. 2) via diode K450 (FIG. 8), conductors c422 to c022 (FIG. 7) of the lock-out diode matrix DM41–DM01, emitter-to-collector junction of transistor T013, conductor c050 (FIG. 7) and conductors c450 (FIG. 6) to c050 (FIG. 2). Since only the base of transistor T021 (FIG. 2) is suitably biassed, as described above, only this transistor becomes operative. In other words the transistor T021 is only operated when the associated transistor T000 and the transistor T013 associated to the group of transistors T000 to T004 have both been made conductive. In this way one prevents wrong combinations of the transistors T000 to T404 and T013 to T413, e.g. of T000 and T413, from becoming effective.

The conductive transistor T021 considerably increases the potential of the junction point of the resistors R021 and R022 (FIG. 2) due to which the transistor T020 associated to the transistor T000 is made conductive. The conductive transistor T020 directly applies an inhibiting battery potential to the input terminals A01 to A04 of the lock-out diode matrix DM00 in the following circuit : battery (FIG. 2), diode K460 (FIG. 6), conductors c423 to c023, emitter-to-collector junction of transistor T020, column conductor c000 of DM0, diodes d001 to d004. A ground applied to any of these input terminals A01 to A04 of the set A00 to A04 is thus prevented from having an effect on the transistors T001 to T004 respectively. In other words, and for the same reason as transistor T011, transistor T020 hence realizes a definitive selection or lock-out in the set of input terminals A00 to A04.

The conductive transistor T021 (FIG. 2) also applies the full ground at K450 (FIG. 8) to the output I00 and hence to one end of the winding of relay Ar000 (FIG. 1) in the following circuit : ground, diode K450 (FIG. 8) row conductors c422 to c022 (FIG. 7) of the lock-out diode matrix DM41–DM01, emitter-to-collector junction of transistor T013, conductors c050 (FIG. 7) and c450 to c050 (FIGS. 6, 2), emitter-to-collector junction of transistor T021 (FIG. 2), resistor R023, diode K000, output I00, winding of the 10 relays Ar000 to Ar009 (FIG. 1).

These relays are however prevented from being energized because the other end of their winding is not yet connected to a battery at an output of the second lock-out arrangement since, as mentioned above, the operation of the latter arrangement is only enabled after a check and a double test operation have successively been performed with success.

Figure 5:
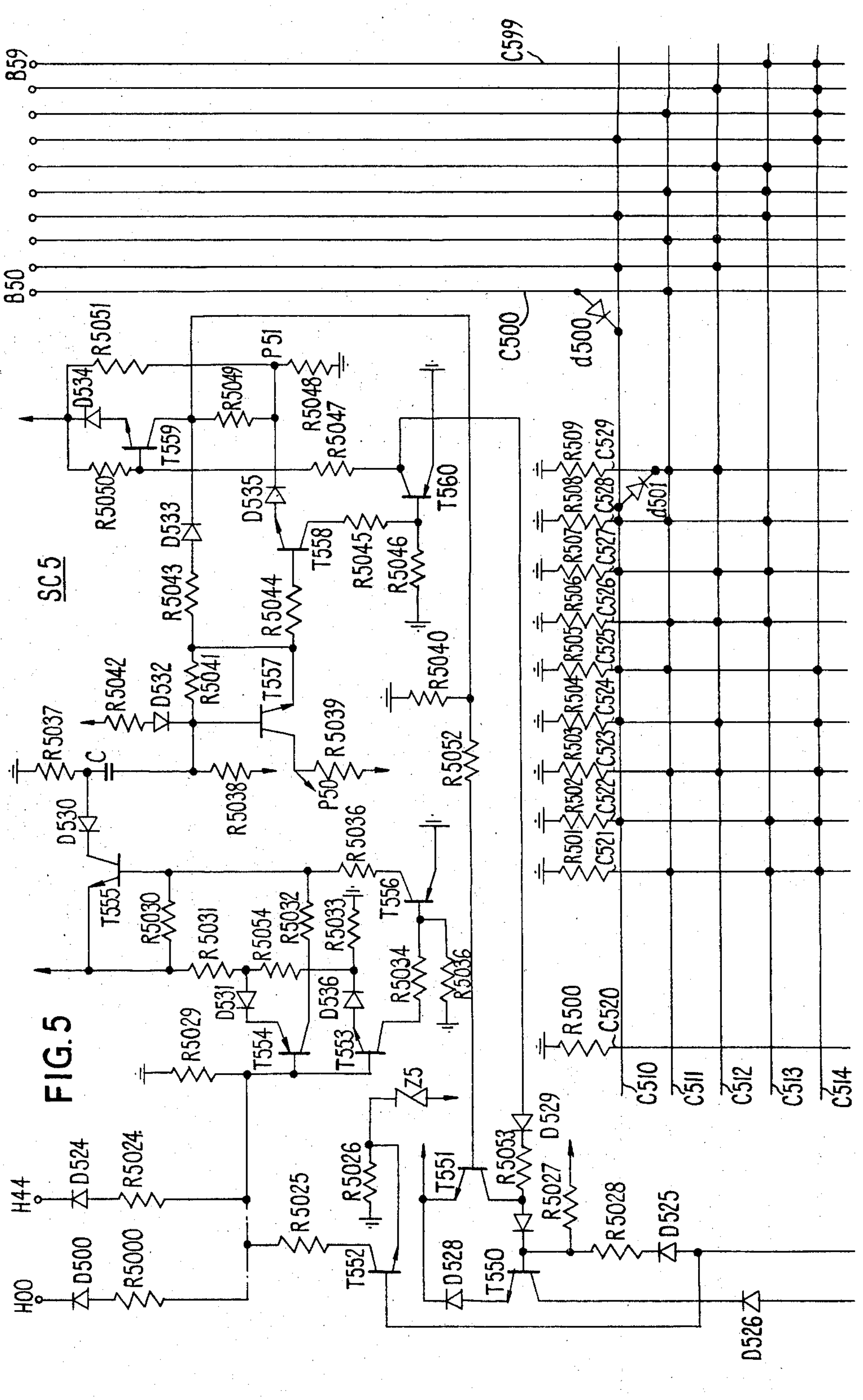

These check and test operations are described in detail hereinafter, reference being made to the upper part of FIG. 5 wherein are shown :

a one-out-of 25 check circuit which mainly comprises the transistors T553 and T554 the bases of which are connected to the 25 output terminals H00 to H44 of the collectors of the transistors T000 to T404. The aim of this circuit is to check that really only one of these transistors has been made conductive;

a double test circuit mainly including the transistors T555 to T560, a resistance R5039 which is common to the lock-out circuit shown and to the homologous lock-out circuit associated to translator TRB, and a timing circuit including the capacitor C and which permits the operation of the double test circuit only for a time period equal to half the occupation time of the translator TRA or TRB. In case there are n translators the time period is taken equal to 1/nth of that occupation time.

Since the terminals H00 to H44 (FIGS. 3, 5) 5) of the transistors T000 to T404 normally connected to ground substantially no current flows through resistor R5029 (FIG. 5) so that the PNP transistor T554 is prevented from becoming conductive, whereas the NPN transistor T553 is made conductive by the ground at resistor R5029. Consequently a current flows from ground to battery in the following circuit : ground, resistors R5035 and R5034, transistor T553, diode D536, resistors R5054 and R5031, battery. By the potential decrease thus occurring at the junction point of the resistors R5035 and R5034 the PNP transistor T556 becomes conductive so that a current starts flowing from ground to battery via transistor T556 and resistors R5036 and R5030. Consequently transistor T555 becomes conductive so that the upper plate of capacitor C is connected to battery via diode D530 and transistor T555. The lower plate of the capacitor C being already connected to battery via resistor R5038, this capacitor C cannot be charged and hence the double test circuit cannot be operated.

None of the other transistors T557 to T560 is conductive. However current flows in the potentiometer circuit constituted by the resistors R5048 and R5051, the potential thus developed at the junction point P51 of these resistors being insufficient to make transistor T551 conductive. Also transistor T550 is not conductive since its base is connected to battery via resistor R5027.

As described above,the conductive transistor T000 applies a battery to its collector and hence activates the output terminal H00. Consequently a current is then able to flow from the ground at resistor R5029 in SC5 to the terminal H00 via this resistor R5029, resistor R5000 and diode D500. The circuit has been now so designed that when only one of the output terminals H00 to H44 has been activated the voltage then appearing at the junction point of the resistors R5029 and R5000–R5024 is simultaneously sufficiently negative to block the NPN transistor T553 and sufficiently positive to block the NPN transistor T554 whilst in case more than one of the terminals H00 to H44 has been activated the potential at the junction point of the resistors R5029 and R5000–R5024 is sufficiently negative to operate transistor T554 and to block transistor T553. Also in this case transistor T555 is operated thus preventing capacitor C from being charged and the double test circuit from being operated.

Supposing now that only the terminal H00 has been activated in the way described above, both the transistors T553 and T554 of the check circuit are blocked by the potential these occurring at the junction point of the resistors R5029 and R5000–R5024.

Due to transistor T553 being blocked the base potential of transistor T556 is increased to ground so that the transistors T556 and T555 are successively blocked and that capacitor C is hence able to charge in the following circuit : ground, resistor R5037, capacitor C, resistor R5038, battery.

Consequently the potential at the junction point of the resistor R5038 and the capacitor R5038 is suddently increased and then gradually decreases, the time constant of this charge circuit being so chosen that the transistor T557 is thus made conductive for a time period equal to half the occupation time of the translator TRA or TRB. During that time interval current flows from ground to battery in the following circuit : ground, resistor R5039, transistor T557 :

resistor R5043, diode D523, resistor R5052, base-to-emitter junction of transistor T551, battery;

resistor R5044, base-to-emitter junction of transistor T558, diode D535, resistor R5051, battery.

The potential at the junction point of transistor T557 and resistor R5044 which is normally at battery potential via the resistors R5041 and R5038 is thus increased due to which transistor T558 is operated so that a current starts flowing in the following circuit : ground, resistors R5046 and R5045, collector-to-emitter junction of transistor T558, diode D535, resistor R5051; battery.

By the potential decrease thus produced at the base of transistor T560 the latter transistor becomes conductive due to which a current starts flowing in the following circuits : ground, emitter-to-collector junction of transistor T560, diode D529, resistor R5053, diode D527, resistor R5027, battery. Consequently transistor T551 is made conductive so that the current flow to battery via diode D527 and resistor R5027 is prevented, thus also preventing the operation of transistor T550;

resistors R5047 and R5050, battery. Consequently the potential at the junction point of the resistors R5047 and R5050 is increased so that transistor T559 becomes conductive due to which the series connection of resistor R5049, the collector-to-emitter junction of transistor T559 and the diode D534 is branched in parallel with resistor R5051. Hence the potential at the junction point P51 of the resistors R5048 and R5049 decreases considerably so that transistor T558 draws more current and that a full battery is applied to the base of transistor T551 via diode D534, transistor T559 and resistor R5052. Consequently the latter transistor T551 is made non-conductive so that a current is again able to flow from ground to battery via transistor T560, diode D529, resistor R5053, diode D527 and resistor R5027. As a result thereof transistor T550 becomes conductive, indicating that the one-out-of-25 check and the double test have both been successful.

In connection with the above the following should be noted :

due to the fact that transistor T558 draws more current the potential at the junction point P50 of the resistor R5039 and the transistor T557 considerably decreases so that since the resistor R5039 is common to the double test circuit shown and to the other double test circuit forming part of the lock-out circuit associated to the translator circuit TRB, the transistor of the latter circuit corresponding to T557 will be prevented from being operated. This double test circuit will however be able to test a second time after the time period determined by the capacitor C has elapsed, this time period being equal to half the occupation time of a tranlator. In this way one is sure that the double test circuits will operate in an alternate manner so that it is impossible that a same register circuit is simultaneously selected by the two lock-out circuits;

transistor T550 is operated only when both the transistors T560 and T559 are conductive. In this way one is sure that all transient phenomena have disappeared. It has indeed been found that it may happen that during such transients T560 and T559 are not simultaneously operated.

The conductive transistor T550 enables the operation of the second lock-out arrangement by applying a full battery to the emitters of all the transistors T510 to T519 thereof via diode D526, the collector-to-emitter junction of transistor T550 and diode D528.

Before describing the operation of the second lock-out arrangement, it should be noted that once a lock-out operation has been performed in the first lock-out arrangement SCO-SC4 the battery then applied to the 24 excluded ones of the terminals A00 to A44 prevents eventual calling grounds of the corresponding 24 register groups RE010–RE019 to RE240–RE249 from becoming effective, as is clearly visible from FIG. 1. For instance when, as described above, the terminal A00 has been selected the 24 terminals A01 to A44 are excluded by a battery applied thereat so that a calling ground applied by any one of the register circuits RE010–RE019 to RE240–RE249 has no influence on the second lock-out arrangement SC5. On the contrary, a calling ground applied by any one of the register circuits RE000 to RE009 will appear at the corresponding one of the input terminals B50 to B59 of this second lock-out arrangement SC5.

As supposed above a calling ground of register circuit RE000 is applied to terminal B50 of the second lock-out arrangement. Consequently a current then flows from this input terminal to battery via column conductor *c*500 of a lock-out diode matrix DM50, resistor R510 (FIG. 9), diode *d*510, resistor R580 and protecting diode *d*570. Predetermined potentials are hence applied to the row conductors *c*510 and *c*511 of the diode matrix DM50 the diodes of which, *d*500 and *d*501 excepted, have been represented by small circles, and to the base of transistor T500 (FIG. 1) which is made conductive since its emitter and collector are suitably biassed.

In the diode matrix DM50 each of the input terminals B50 to B59 is connected via diodes to all but an associated one of the column conductors *c*520 to *c*529 via two out of the five row conductors *c*510 to *c*514. For instance, input terminal B50 is connected via diodes to the column conductors *c*521 to *c*529 but not to the associated column conductor *c*520.

The operated transistor T550 increases the base potential of transistor T510 which however only becomes conductive after transistor T500 has applied a battery to the emitters of the transistors T510 to T519 in the manner described above. The conductive transistor T510 applies an inhibiting battery potential to the column conductor *c*520 of the lock-out diode matrix DM50 via diode *d*520, transistor T510, diode D526, transistor T550 and diode D528.

This inhibiting potential prevents calling grounds applied to the other input terminals B51 (not shown) to B59 from becoming effective. Supposing for instance that a calling ground is applied to input terminal B59 the current normally flowing from this input terminal B59 to the base of transistor T509 via resistor R519 and diode d519 is now derived via column conductor c509, a diode, row conductor c514, a diode and column conductor c520 which is connected to battery. Hence, finally only the transistors T500 and T510 are conductive so that the diode matrix DM50 has really performed a lock-out operation.

Due to the potential decrease occurring at the junction point of the diode d520 and the transistor T510, upon the latter becoming conductive, transistor T520 is made conductive since its emitter is already connected to ground at output I00 via diode *d*550, output E50 and the windings of the ten relays A*r*000 to A*r*009.

Consequently a battery is applied to the other ends of the windings of the 25 relays A*r*000 to A*r*240 so that finally only the relay A*r*00 which is common to the group of 10 relays A*r*000 to A*r*009 and to the group of 25 A*r*000 to A*r*240 is energized in the following circuit : ground at K450 (FIG. 8), conductors *c*422 to *c*022 (FIG. 7), transistor T013, conductors *c*450 (FIG. 10) to *c*050 (FIG. 2), transistor T021, resistor R023, diode K000, output I00, winding of relay A*r*000 (FIG. 1), output E50 (FIG. 9), diode *d*550, transistor T520, diodes *d*530 and *d*450, resistor R560, battery. The energized relay A*r*000 connects the register circuit RE000 to the translator circuit TRA in a not shown but obvious way.

Figures 6, 10:
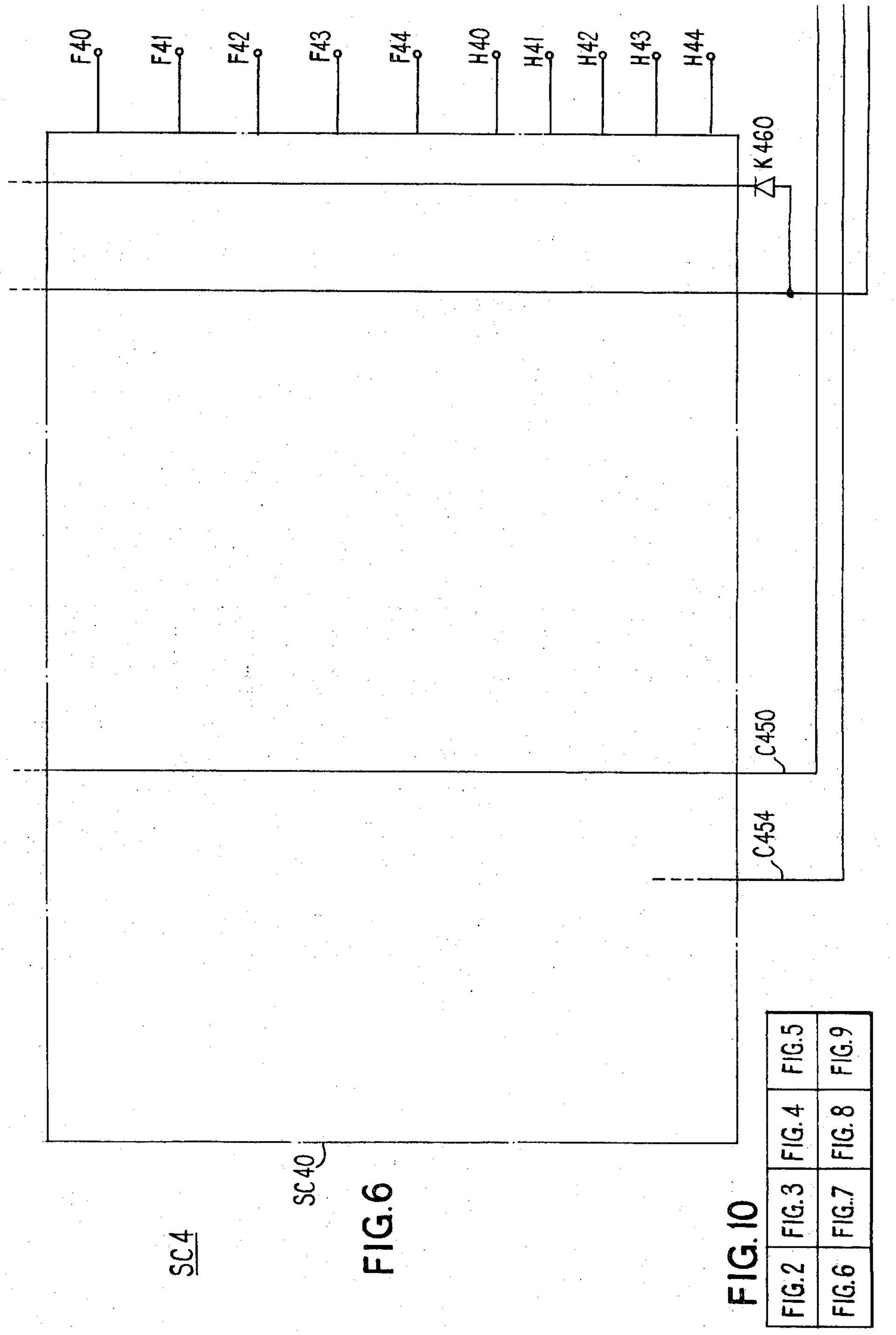
FIG. 10 shows how FIGS. 2 to 9 must be assembled.
Figure 7:
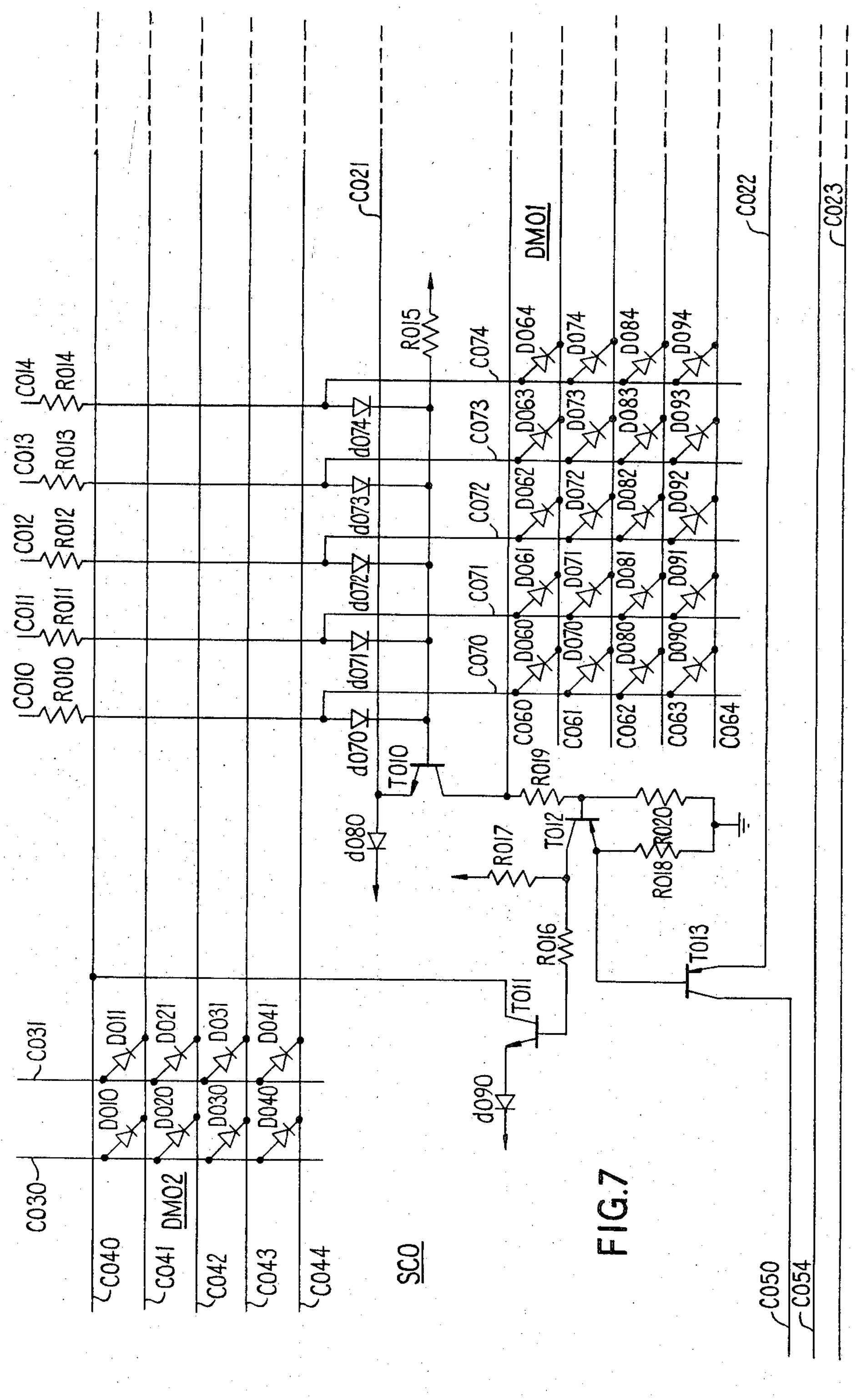
Figure 8:
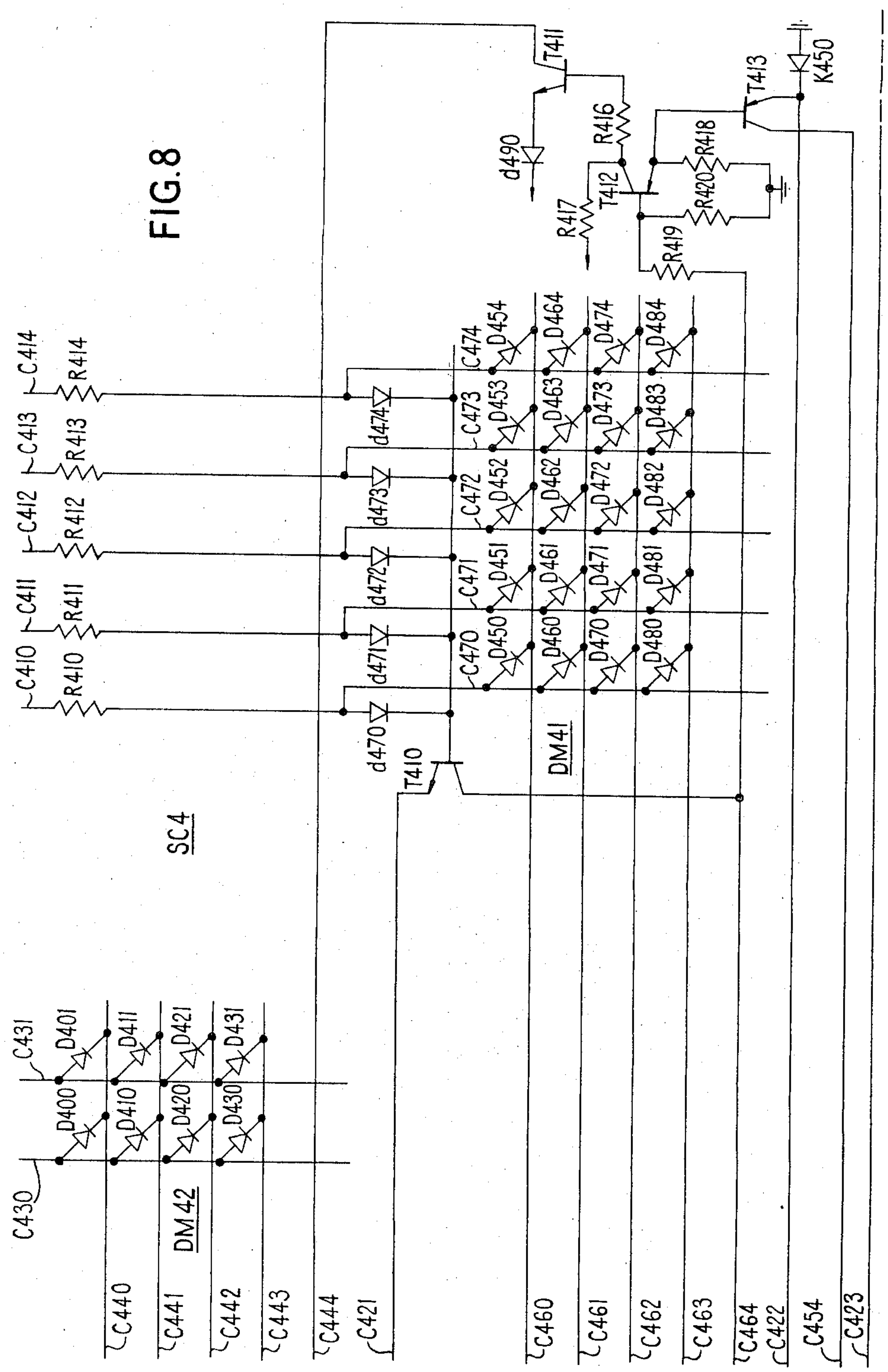
Figure 9:
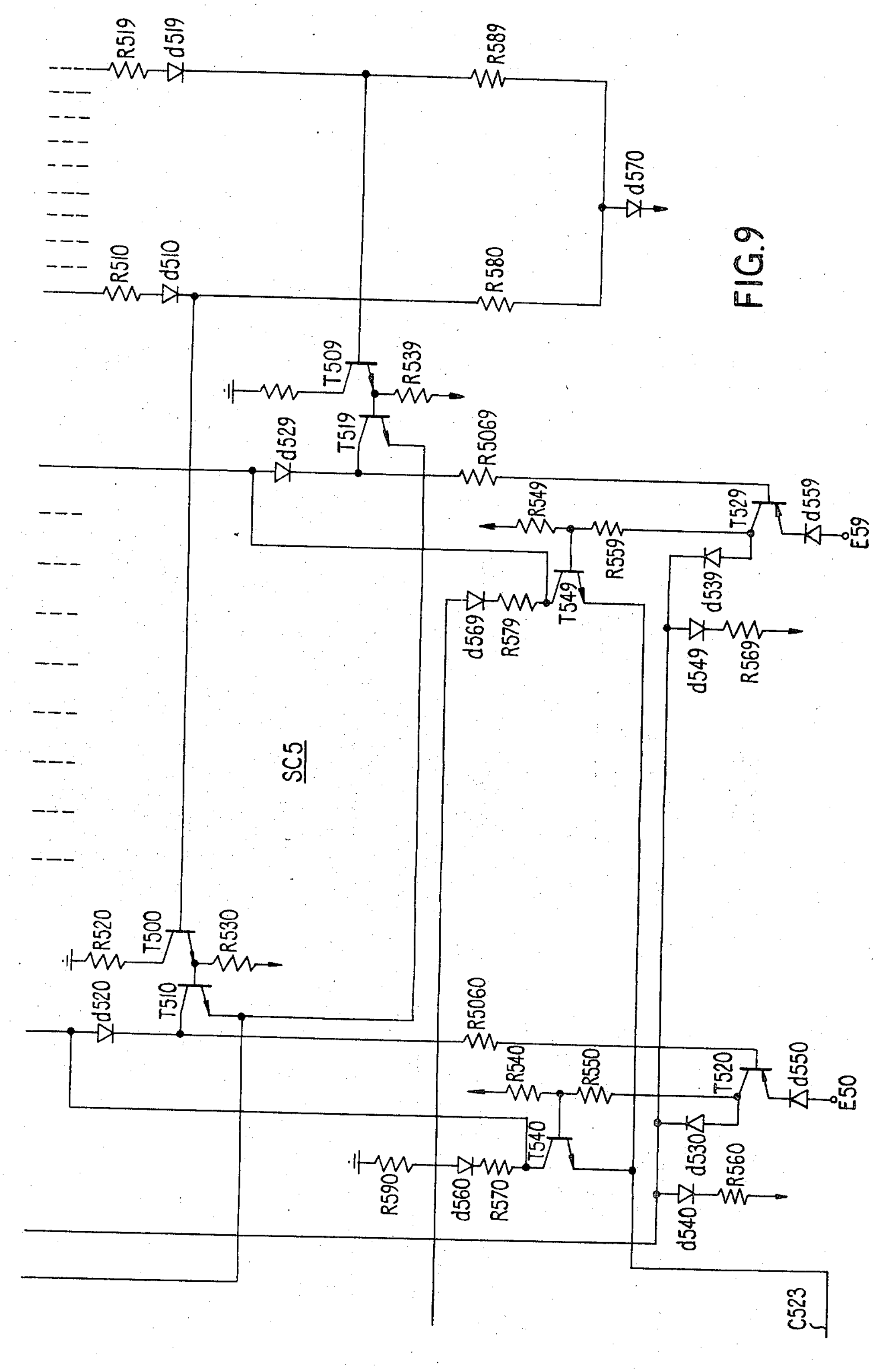

From the ground at the emitter of transistor T520 current also flows to battery via this transistor T520 and the resistors R550 and R540 thus increasing the potential at the junction point of these resistors. Consequently transistor T540 becomes conductive since the emitter thereof is connected to a full inhibiting battery (FIG. 2) via conductors *c*523 (FIG. 2) to *c*023 (FIG. 6) and diode K460 (FIG. 6).

The transistor T540 being conductive a current is able to flow from ground to battery :

via resistor R590 (FIG. 9), diode *d*560, resistor R570 and transistor T540. By the then produced potential drop at the junction point of the resistor R590 and the diode *d*560 the operation of the other transistors T541 (not shown) to T549 is prevented;

via resistor R500 and column conductor *c*520. The latter conductor is thus again connected to battery so that grounds applied to other input terminals than B50 are directly absorbed and can have no effect on the transistors T511 (not shown) to T519. Even when the transistor T500 and subsequently the transistor T510 temporarily release due to the fact that the ground at input terminal B50 temporarily disappears the lock-out is maintained.

By the current flowing in the above operating circuit of the relay A*r*000 the potential at the junction point of the diodes *d*530 and *d*540 is increased so that also the base potential of transistor T552 (FIG. 5) is increased. Consequently, the latter transistor T552 becomes conductive so that the junction point of the resistors R5029 and R5000–R5024 is connected to the tapping point of the potentiometer R5026, Z5 due to which the check and double test circuits are released and become available for a new operation.

It should be noted that the double test circuit is anyhow released after the time period determined by the capacitor charge circuit has elapsed. In order to prevent the junction point of the capacitor C and the resistor R5038 from decreasing below −48 Volts at the moment the upper plate of this capacitor is suddenly connected to battery when transistor T555 is made conductive, this junction point is clamped to −48 Volts via resistor R5042 and diode D538..

When the transistor T520 becomes conductive current also flows from ground to battery via this transistor T520, diode d530, diode D525 and resistors R5028 and R5027. In this way the transistor T550 is locked in its conductive condition independently from the condition of transistor T551 and of the double test circuit.

The lock-out circuit is released when the calling ground disappears.

Preference values of the various resistances included in the lock-out circuit are the following :

| | kilohms |
|---|---|
| R0000 to R2490 | 5.1 |
| R0002 to R2492 | 5.1 |
| R0001 to R2491 | 15.1 |
| R0003 to R2493 | 15.1 |
| R000 to R004, R400 to R404 | 5.1 |
| R010 to R014, R410 to R414 | 24 |
| R014, R415 | 100 |
| R016, R416 | 10 |
| R017, R417 | 8.2 |
| R018, R418 | 10 |
| R019, R419 | 100 |
| R020, R420 | 10 |
| R021, R061 | 30 |
| R022, R062 | 10 |
| R023, R063 | 0.36 |
| R024, R064 | 10 |
| R025, R065 | 6.2 |
| R500 to R505 | 10 |

| | |
|---|---|
| R510 to R519 | 5.1 |
| R520 to R529 | 8.2 |
| R530 to R539 | 30 |
| R540 to R549 | 10 |
| R550 to R559 | 6.2 |
| R560 to R569 | 0.39 |
| R570 to R579 | 15 |
| R580 to R589 | 10 |
| R590 | 10 |
| R5000-R5024 | 15 |
| R5025 | 11 |
| R5026 | 10 |
| R5027 | 30 |
| R5028 | 10 |
| R5029 | 10 |
| R5030 | 10 |
| R5031 | 10 |
| R5032 | 10 |
| R5033 | 5.1 |
| R5034 | 10 |
| R5035 | 10 |
| R5036 | 20 |
| R5037 | 20 |
| R5038 | 200 |
| R5039 | 3.9 |
| R5040 | 30 |
| R5041 | 20 |
| R5042 | 1 |
| R5043 | 5.1 |
| R5044 | 51 |
| R5045 | 10 |
| R5046 | 10 |
| R5047 | 10 |
| R5048 | 11 |
| R5049 | 33 |
| R5050 | 10 |
| R5051 | 33 |
| R5052 | 10 |
| R5053 | 8.2 |
| R5060 to R5069 | 6.9 |

In connection with the diode matrix DM50 it should be noted that when there are $m$ input terminals, each input terminal is coupled via diodes with $p$ out of $q$ row conductors, the number of combinations $C^q_p$ being at least equal to $m$ and the $p$ wires are connected via further diodes with all but one of m column conductors which are connected with the lock-out transistors, the excepted column conductor being the one which is connected to said input terminal.

While the principles of the invention have been described above in connection with specific apparatus, it is to be clearly understood that this description is made only by way of example and not as a limitation on the scope of the invention.

I claim:

1. A lock-out circuit comprising a plurality of inputs and a plurality of outputs to which bistate devices are connected such that only one bistate device is operated irrespective of the number of inputs which may simultaneously be activated, said circuit having two series of outputs and means coupling said bistate devices to a distinct pair of outputs from said two series.

2. A lock-out circuit according to claim 1, in which each of said bistate devices has only two terminals and may be operated by a change in the current flowing between the two paired outputs.

3. A lock-out circuit according to claim 1, characterized in that it includes a first and a second lock-out arrangement, the operation of said second lock-out arrangement being enabled only after the correct operation of said first lock-out arrangement, and that each of said inputs is connected via a common resistance and decoupling diodes to a distinct pair of input terminals from a first and a second series of input terminals of said first and said second lock-out arrangement having said first and second series of outputs in such a manner that a group of inputs is coupled to each input terminal, each of said lock-out arrangements being adapted to activate only one of its outputs irrespective of the number of its input terminals which may simultaneously be activated, said first lock-out arrangement when operated preventing all the inputs which are not connected to the input terminal corresponding to the activated output from activating the input terminals of the two lock-out arrangements to which they are connected.

4. A lock-out circuit according to claim 3, characterized in that it includes a check circuit the input of which is connected to said first lock-out arrangement and which is adapted to check if all except one of the input terminals of said first lock-out arrangement have been prevented from being activated, said check circuit having an output which is coupled to said second lock-out arrangement and which controls the operation thereof.

5. A lock-out circuit according to claim 4, characterized in that the output of said check circuit is connected to a timing circuit forming part of a double test circuit, said timing circuit being triggered to its operative condition for a predetermined time interval during which it enables the operation of said double test circuit when said check circuit has operated successfully, and the thus operated double test circuit enabling via gating means the operation of said second lock-out arrangement, and that said lock-out circuit is associated to a similar second lock-out circuit which has said plurality of inputs and which includes first and second lock-out arrangements, a check circuit, and a double test circuit with a timing circuit which are similar to those included in said first lock-out circuit, said double test circuits being intercoupled in such a way that only one of them can be operated simultaneously.

6. A lock-out circuit according to claim 3, characterized in that in said first lock-out arrangement each input terminal is coupled to temporary lock-out means and to definitive lock-out means, the temporary and definitive lock-out means coupled to an input terminal being successively operated when this one input terminal is activated due to which temporary and definitive inhibiting potentials are applied to all the input terminals, said one input terminal excepted.

7. A lock-out circuit according to claim 3, characterized in that said first lock-out arrangement is constituted by a plurality of third lock-out arrangements which are each coupled to the input terminals of an associated group of the groups of input terminals in which said first series is subdivided and by a fourth lock-out arrangement which is coupled to all the input terminals of said groups, each of said third lock-out arrangements being adapted when an input terminal of the associated group is activated to inhibit all but said input terminal of the associated group of input terminals and said fourth lock-out arrangement being adapted to inhibit the input terminals of all but those of said associated group of input terminals. .

8. A lock-out circuit according to claim 6, characterized in that in each of said third lock-out arrangements each input terminal of the associated group is coupled via an individual first resistance to first temporary lock-out means and is associated to first definitive lock-out means, while in said fourth lock-out arrangement the input terminals of each of said groups are each coupled at least via an individual second resistance to second temporary lock-out means which are associated to said group which is itself associated to second definitive lock-out means, and that said first temporary and definitive lock-out means when successively operated due to the associated input terminal of a group of input terminals being activated are adapted to successively apply first temporary and definitive inhibiting potentials to all the input terminals except said associated input terminal of said group, while said second temporary and definitive lock-out means when successively operated due to an input terminal of the associated group being activated are adapted to successively apply second temporary and definitive inhibiting potentials to all the input terminals except to those of said associated group.

9. A lock-out means according to claim 8, characterized in that said first definitive lock-out means associated to an input terminal of a group of input terminals are only operated after the first and second temporary lock-out means associated to said input terminal and to said group have been operated.

10. A lock-out circuit according to claim 8, characterized in that in each of said third lock-out arrangements each input terminal of the associated group is coupled via a said first resistance to the first input of an associated first AND-gate the second input of which is coupled to said first temporary inhibiting potential and the output of which is coupled to all the input terminals except said associated input terminal of said group via first diodes and that in said fourth lock-out arrangement all the input terminals of each of said groups are each coupled at least via a said second resistance to the first input of an associated second AND-gate the second input of which is coupled to said second temporary inhibiting potential and the output of which is coupled to all the input terminals except to those of said associated group via second diodes.

11. A lock-out circuit according to claim 10, characterized in that each of said input terminals is coupled to the first input of a said second AND-gate via the series connection of a said first and a said second resistance.

12. A lock-out circuit according to claim 10, characterized in that said second diodes are coupled to those ends of said second resistance which are not connected to said first resistances.

13. A lock-out circuit according to claim 9, characterized in that in each of said third lock-out arrangements a third and a fourth AND-gate are associated to each of said first AND-gates, while in said fourth lock-out arrangement a fifth and a sixth AND-gate are associated to each of said second AND-gates and hence to each of said groups, that the output of each of said second AND-gates is coupled to the first input of ther associated fifth and sixth AND-gates the second inputs of which are coupled to a second definitive inhibiting potential and to an output activating potential respectively, the output of said fifth gate being connected via third diodes to all the input terminals of the other groups to which said fifth gate is not associated and the output of said sixth gate being connected to the first input of the third AND-gate associated to one input terminal of the group of input terminals to which said second AND-gate is associated, that the second input of said third AND-gate is coupled to the output of the first AND-gate which is connected to said one input terminal, the output of said third AND-gate being coupled to the first input of a fourth AND-gate and that the second input of said fourth AND-gate is coupled to a first definitive inhibiting potential, while its output is coupled via said first diodes to the other input terminals, of said group, to which the first AND-gate associated to said third AND-gate is not connected.

14. A lock-out circuit according to claim 13, characterized in that the output of each of said third AND-gates constitutes an output of said first lock-out arrangement.

15. A lock-out circuit according to claim 10, characterized in that each of said input terminals is connected via the series connection of said first and second resistances and of a third resistance to one pole of a first DC source the other pole of which is connected to an input of the lock-out circuit when the latter input is activated, and that the first and second tapping points between said first and second and between said second and third resistances respectively are connected to the first inputs of said first and second AND-gates respectively.

16. A lock-out circuit according to claim 13, characterized in that the output of each of said second AND-gates is coupled to the first inputs of the associated fifth and sixth AND-gates via an amplifier circuit.

17. A lock-out circuit according to claim 10, characterized in that each of said AND-gates is constituted by a transistor.

18. A lock-out circuit according to claim 16, characterized in that said amplifier circuit is constituted by a transistor.

19. A lock-out circuit according to claim 8, characterized in that said first and second temporary inhibiting potentials are different from each other.

20. A lock-out circuit according to claim 8, characterized in that said second temporary inhibiting potential and said first and second definitive inhibiting potentials are equal.

21. A lock-out circuit according to claim 3, characterized in that each of the input terminals of said second lock-out arrangement is coupled to the first input of an associated gate of a plurality of seventh AND-gates, each seventh AND-gate having a second input which is coupled to an enabling potential and having an output which is coupled via fourth diodes to all the input terminals of said second lock-out arrangement, except to the one to which the first input of said seventh AND-gate is coupled.

22. A lock-out circuit according to claim 20, characterized in that each of said input terminals is coupled to the first input of a said seventh AND-gate via an amplifier circuit.

23. A lock-out circuit according to claim 5, characterized in that the second inputs of said seventh AND-gates are coupled in common to said gating means which when activated provide said enabling potential.

24. A lock-out circuit according to claim 21, characterized in that the output of each of said seventh AND-gates is coupled to the first input of an associated one of a plurality of eighth AND-gates, each eighth AND-gate having a second input which is coupled to an associated one of the outputs of said second lock-out arrangement and an output which is coupled to an activating potential.

25. A lock-out circuit according to claim 24, characterized in that the output of each of said eighth AND-gates is coupled to the first input of an associated one of a plurality of ninth AND-gates, each ninth AND-gate having a second input which is coupled to a third inhibiting potential and an output which is coupled to the output of an associated seventh AND-gate.

26. A lock-out circuit according to claim 5, characterized in that the outputs of said eighth AND-gates are coupled to said gating means in such a way that the latter are maintained activated when at least one of said outputs of said eighth AND-gates is activated, independently from the condition of said double test circuit.

27. A lock-out circuit according to claim 4, characterized in that the outputs of said eighth AND-gates are coupled to said check circuit in such a way that the latter is inhibited when at least one of said outputs of said eighth AND-gates is activated.

28. A lock-out circuit according to claim 21, characterized in that each of the input terminals of said second lock-out arrangement is connected via the series connection of a fourth and a fifth resistance to one pole of a DC source the other pole of which is connected to an input of the look-out circuit when the latter input is activated, and that the tapping point between each of said interconnected fourth and fifth resistances is coupled to the first input of a distinct one of said seventh AND-gates.

29. A lock-out circuit according to claim 21, characterized in that any of said AND-gates is constituted by a transistor.

30. A lock-out circuit according to claim 21, characterized in that said amplifier circuit is constituted by a transistor.

31. A lock-out circuit according to claim 21, characterized in that each of the *m* input terminals of said second lock-out arrangement is coupled to all but an associated one of the outputs of said seventh AND-gates via fourth diodes due to each input terminal being coupled via fourth diodes to *p* out of *q* wires, $C^p_q$ being at least equal to *m*, and due to those *p* wires being coupled also via fourth diodes to all the outputs of said seventh AND-gates, except to that of the associated seventh AND-gate.

32. A lock-out circuit with a plurality of inputs and with a plurality of outputs and such that only one output is activated irrespective of the number of inputs which may simultaneously be activated, characterized in that each input is coupled to temporary lock-out means and to definitive lock-out means, the temporary and definitive lock-out means coupled to an input being successively operated when this one input is activated due to which temporary and definitive inhibiting potentials are applied to all the inputs, said one input terminal excepted.

33. A lock-out circuit according to claim 32, characterized in that each of said inputs is coupled to the associated temporary lock-out means via a resistance.

34. A lock-out circuit with a plurality of inputs and with a plurality of outputs such that only one output is activated irrespective of the number of inputs which may simultaneously be activated, characterized in that it is constituted by a plurality of first lock-out arrangements which are each coupled to the inputs of an associated group of the groups of inputs wherein said inputs are subdivided and by a second lock-out arrangement which is coupled to all the inputs of said groups, each of said first lock-out arrangements being adapted when an input of the associated group is activated to inhibit all but said input of the associated group of inputs and said second lock-out arrangement being adapted to inhibit the inputs of all but those of said associated group of inputs.

35. A lock-out circuit with m inputs and a plurality of outputs and such that only one output is activated irrespective of the number of inputs which may be simultaneously activated, characterized in that each of said *m* inputs is coupled on the one hand to the input of an associated one of a plurality of bistate devices and on the other hand via diodes to *p* out of *q* wires, the number of combinations $C^p_q$ being at least equal to *m* and said *p* wires being coupled via further diodes to all the outputs of the bistate devices except to that of the associated bistate deivce, in such a manner that when a said input is activated the associated bistate device is operated due to which an inhibiting potential is applied to all the inputs, except said activated one.

* * * * *